Jan. 6, 1970  D. P. JUHASZ ET AL  3,487,729
POSITIVE DEPTH CONTROL DRILL
Filed Dec. 6, 1967  5 Sheets-Sheet 1

INVENTORS
DANIEL P. JUHASZ
LUIS A. BOHORQUEZ
PIERRE G. VINDEZ
BY
ATTORNEYS

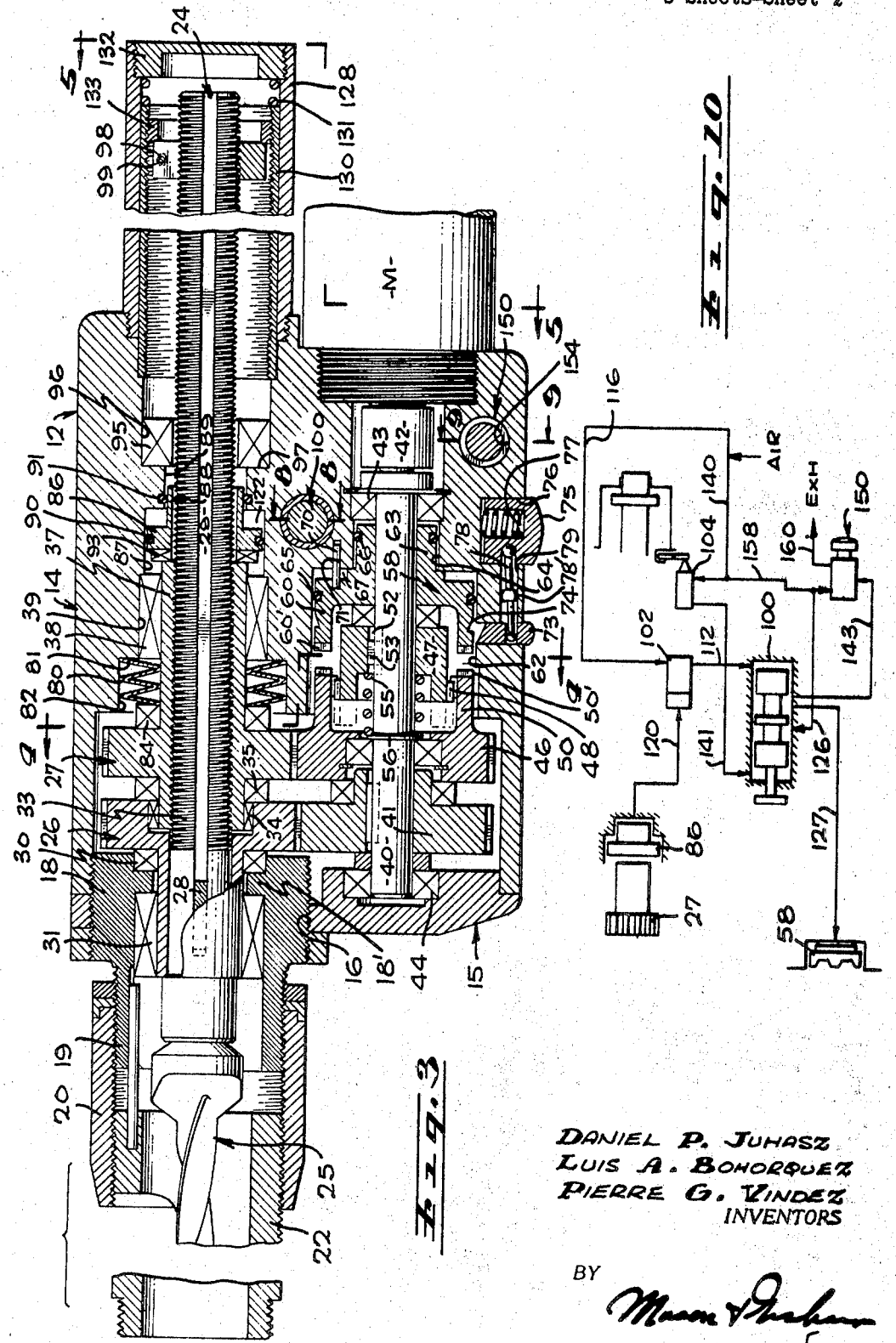

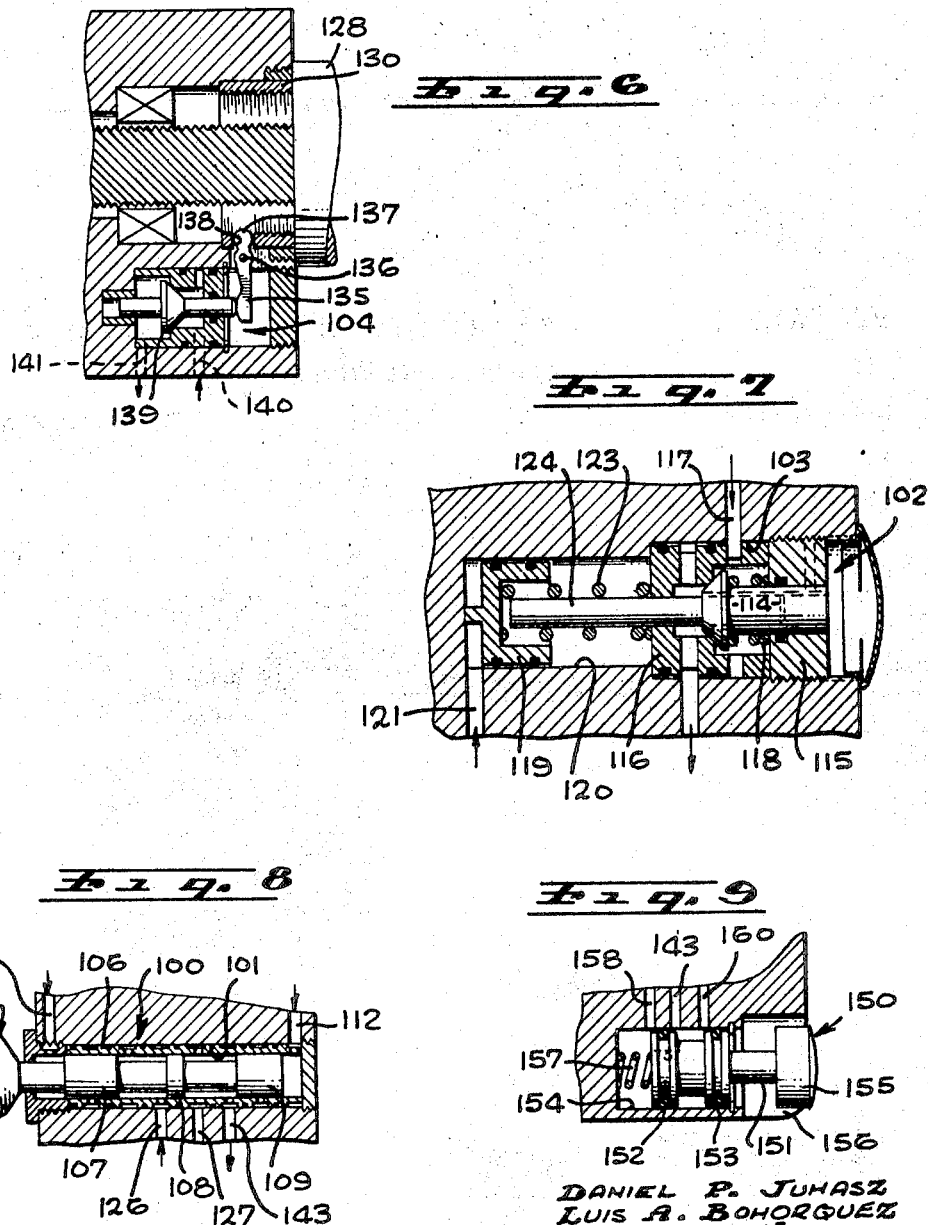

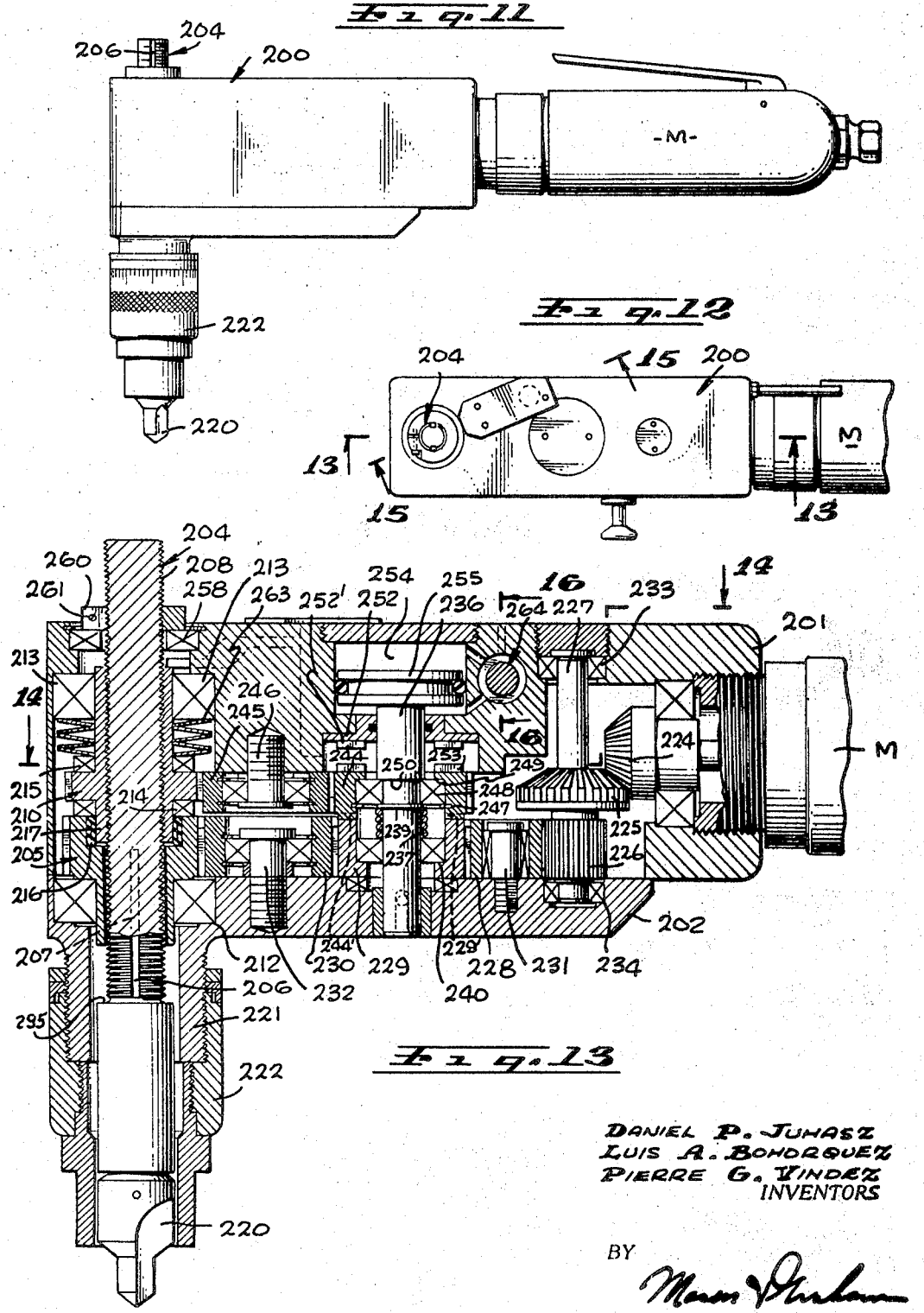

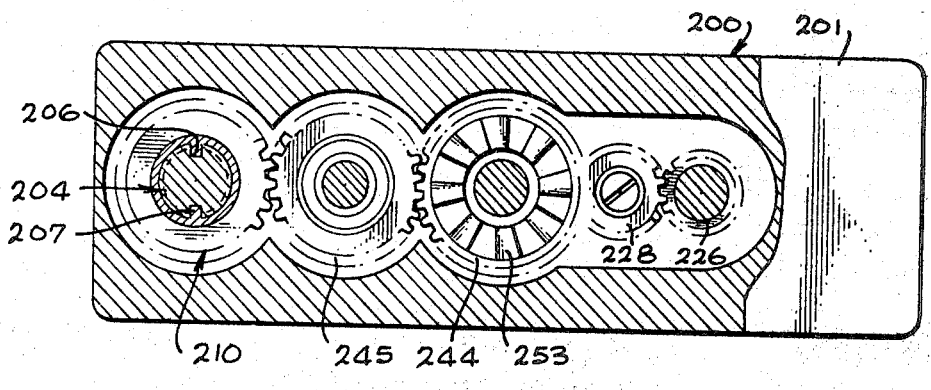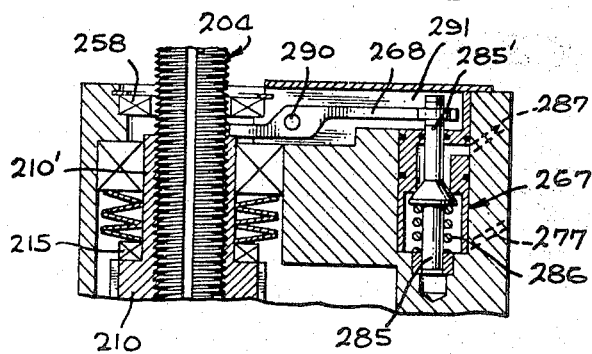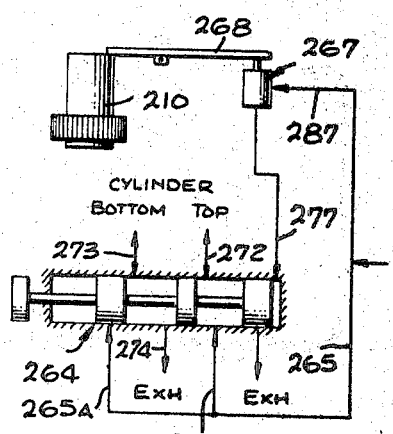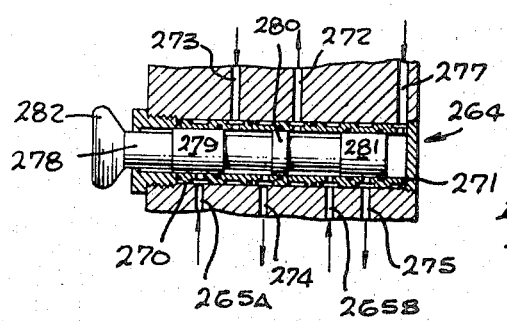

3,487,729
POSITIVE DEPTH CONTROL DRILL
Daniel P. Juhasz, Gardena, Luis A. Bohorquez, Inglewood, and Pierre G. Vindez, Redondo Beach, Calif., assignors, by mesne assignments, to Zephyr Manufacturing Co., Inc., Inglewood, Calif., a corporation of California
Filed Dec. 6, 1967, Ser. No. 688,562
Int. Cl. B23b *45/14, 39/14, 47/18*
U.S. Cl. 77—13                            15 Claims

ABSTRACT OF THE DISCLOSURE

The application discloses portable powered drills adapted to be mounted on a jig or fixture or clamped to the work and having automatic means for advancing and retracting the drill spindle and means for accurately arresting forward movement of the spindle at a predetermined point and causing it to retract while continuing to rotate in the drilling direction. The application also discloses means for automatically arresting the retraction of the spindle, and an auxiliary means for enabling rapid advance of the spindle prior to drilling.

---

Figure 1:
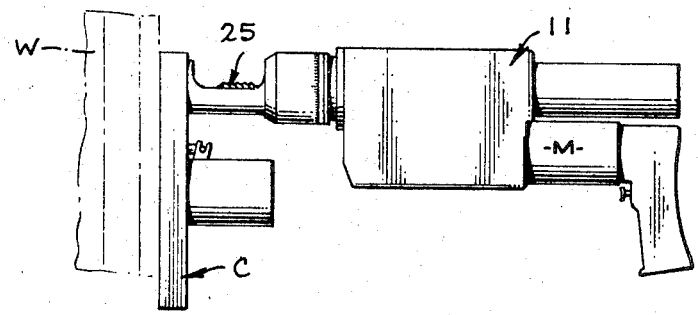

The invention has to do generally with small powered drills adapted to be mounted on a jig or fixture or clamped to the work and of a type which automatically advances the drill a predetermined distance and then retracts it, and more particularly with drills designed to precisely limit the advance of the drill spindle.

An object of the invention is to provide a powered drill having novel means for precisely controlling the advance of the drill spindle so that it will automatically stop its forward motion or accurately bottom out, dwell for a few turns and then retract for a given distance, after which it requires a positive action on the part of an operator to again advance the drill spindle.

Another object is to provide a drill of the type indicated having novel means for positively and precisely arresting the forward motion of the drill spindle at a given point, and then, after a short dwell period, retracting it, which embodies a novel spring-loaded feed nut on the spindle adapted to retract axially when the forward motion of the spindle is arrested for the purpose of operating a control mechanism for setting in motion the means for retracting the spindle.

A further object is to provide a drill with a spindle having automatic feed and retraction means embodying a feed gear or nut mounted for limted axial movement in conjunction with a novel fluid control system embodying a hydraulic system operated by the feed gear which in turn affects the operation of a pneumatic-operated means for effecting retraction of the drill spindle.

Another object is to provide an automatic positive depth control drill in which a feed gear, which is internally threaded and receives the spindle and is mounted for limited axial movement, is used for mechanically operating an element in a fluid control system for effecting retraction of the spindle.

A further object is to provide novel means in a drill of the type indicated for causing the drill to run without advancing or retracting after it has retracted a given distance, thereby requiring a manual operation to advance the drill spindle.

A still further object is to provide novel manually controlled means for effecting rapid advance of the drill spindle in conjunction with a reversible motor.

Figure 2:
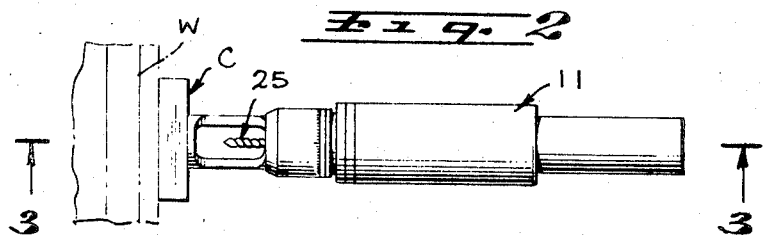
Figures 4, 5:
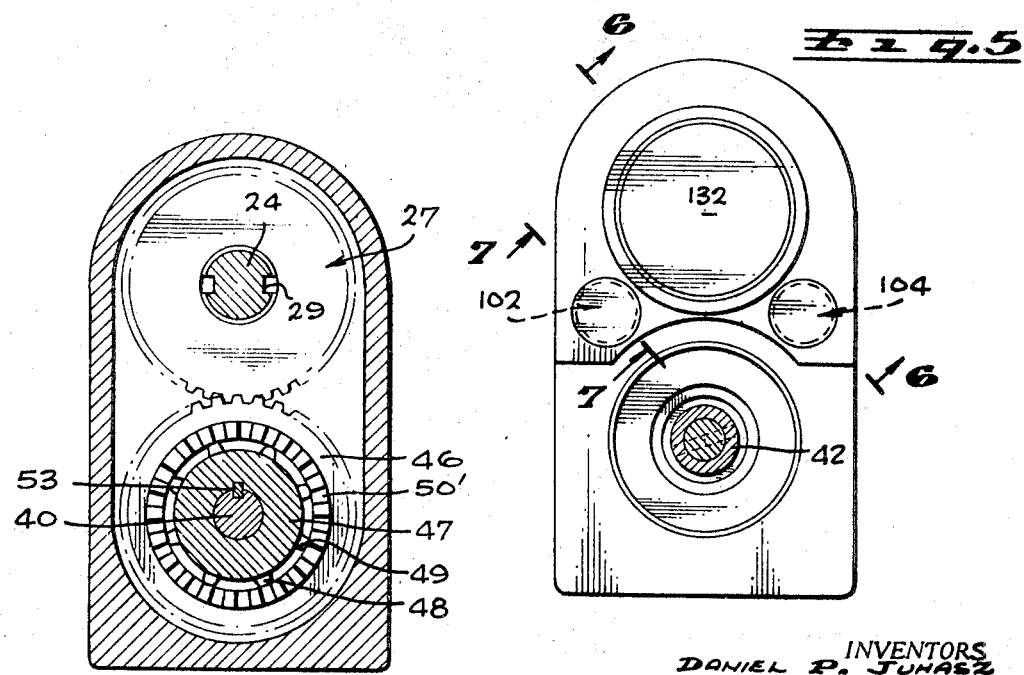

These and other objects will be apparent from the drawings and the following description. Referring to the drawings:

FIG. 1 is a side elevational view illustrating a drill embodying a form of the invention;
FIG. 2 is a plan view;
FIG. 3 is a fragmentary, longitudinal sectional view on line 3—3 of FIG. 2, but on a larger scale;
FIG. 4 is a cross sectional view on line 4—4 of FIG. 3;
FIG. 5 is an end elevational view on line 5—5 of FIG. 3, but with the motor removed;
FIG. 6 is a fragmentary sectional view on line 6—6 of FIG. 5;
FIG. 7 is a fragmentary sectional view on line 7—7 of FIG. 5, but on a larger scale;
FIG. 8 is a fragmentary cross sectional view on line 8—8 of FIG. 3;
FIG. 9 is a fragmentary sectional view on line 9—9 of FIG. 3;
FIG. 10 is a schematic view of the control system;
FIG. 11 is a side elevational view of an alternate form of the invention;
FIG. 12 is a fragmentary plan view;
FIG. 13 is a sectional elevational view on line 13—13 of FIG. 12, but on a larger scale;
FIG. 14 is a fragmentary sectional plan view on line 14—14 of FIG. 13;
FIG. 15 is a fragmentary sectional view on line 15—15 of FIG. 12;
FIG. 16 is a fragmentary cross sectional view on line 16—16 of FIG. 13; and
FIG. 17 is a diagram of the control means.

More particularly describing the invention, in FIGS. 1 and 2 we show a drill 11 clamped to a workpiece W by means of a clamping device C. The invention is particularly suitable for drilling and countersinking where the depth of the hole must be accurately controlled automatically.

Referring particularly now to FIGS. 3–10 for a description of one form which the invention may take, the device includes a housing 12 comprised of a housing body or main housing member 14 and a front plate 15. The latter may be held in place by screws (not shown) or other means. The plate has an internally threaded hole 16 to receive an adapter 18 which has a radially reduced externally threaded forward section 19 upon which a micrometer sleeve 20 is mounted. The sleeve receives an open-sided cylindrical footpiece 22 by means of which the drill is secured to a clamping device C or other means.

An externally threaded spindle 24 extends through the housing and is shown provided with a demountable countersink drill 25 in its forward end. The spindle is supported for rotation and for axial movement in a drive gear 26 and a feed gear 27, the latter being internally threaded and threadedly receiving the spindle so that it acts as a nut. There is a splined connection between the drive gear and the spindle, the drive gear having a pair of internal splines 28 which are received in grooves 29 in the spindle. The drive gear is supported in the adapter 18 by a bearing 30 on one side of a flange 18' and by a bearing 31 on the other side. The feed gear has a short forward hub 33 which is partially received in the drive gear and supported by a bearing 34 with a bearing 35 between the parts. The feed gear has a long rearward hub 37 which is journaled in a bearing 38 in a counterbore 39 in the housing body.

Drive gear 26 is driven by the motor, designated M, which may be one which operates on compressed air (or other gas) by means of a drive shaft 40 and a spur gear 41 that is keyed thereto and meshes with the drive gear. The shaft is connected to the motor shaft by a coupling 42 and is journaled in bearings 43 and 44 mounted in the housing body 14 and plate 15, respectively. With this construction, the spindle is rotated at all times when the motor is running. On the other hand, the feed gear is driven to advance the spindle and stopped to retract it.

Feed gear 27 is driven by a spur gear 46 which is rotatively mounted on shaft 40 and driven thereby when in driving engagement with a coupling element 47 carrying splines 48 adapted to mesh with grooves 49 formed in a hub portion 50 of the gear. The coupling member is keyed to the drive shaft, having a groove 52 in its inner surface which slideably receives a key 53 in the shaft. A compression coil spring 55 between the coupling member and a retainer 56 yieldably holds the former in driving engagement with the spur gear. Thus with the parts in the position of FIG. 3 and the motor operating, both the spindle and feed gear rotate, but, by reason of a desired difference in gear ratio of the drive and feed gears with respect to the drive shaft, the spindle advances.

For the purpose of disengaging the coupling member 47 from gear 46 we provide a brake 58 having an enlarged cylindrical forward section 60 which operates as a piston in bore 62 and a reduced section 63 which is received in a smaller bore 64. Seal rings 65 and 66 are provided, as shown. Fluid (preferably a gas, such as air) under pressure admitted into space 67 behind the brake moves it and the coupling member to the left (FIG. 3) or forwardly, disengaging the coupling member from gear 46 and causing the brake to engage gear 46 to stop its rotation, the forward edge 60′ of the brake and the rear edge 50′ of the gear having mating toothed faces for the purpose. A guide pin 70 in the brake is received in a bore 71 in the housing to prevent rotation of the brake.

A latch means is provided for preventing the brake from returning and for holding it in a position such that it is disengaged from gear 46 and the coupling is disengaged from the gear, leaving the feed gear "free wheeling." The latch means includes a latch pin 73 for engaging in a notch 74 of the periphery of the brake, a button 75 in a recess 76 in the housing fitted with a compression spring 77, and a lever 78 connecting the button with pin 73. The lever has an enlarged central portion 78′ on which it pivots in a bore 79.

It is a particular feature of the invention that we provide means for precisely limiting the advance of the spindle so that it will stop at a predetermined point, dwell for a few turns and then retract. This is accomplished, in general, by providing a fixed abutment in the housing and a stop member on the spindle which strikes the abutment, preventing the spindle from traveling any farther, together with means for allowing the feed gear to then back up slightly and set in operation the means for effecting retraction of the spindle. Referring to this feature more in detail, the feed gear is mounted for limited axial movement but normally is held in its forward position by a compressing spring or springs 80 (preferably Belleville springs) which bear against a shoulder 81 at the end of a counterbore 82 in the housing and against a bearing 84 on the back side of the gear. Associated with the feed gear is a piston 86 which operates in a counterbore 87, the piston including a hub portion 88 received in the bore 89. Suitable seal rings 90 and 91 are provided. A bearing 93 is provided between the end of the feed gear and the piston so that any backward movement of the feed gear will be transmitted to the piston.

The fixed abutment in the housing comprises a thrust bearing 95 in a counterbore 96 and against shoulder 97 in the housing. The bearing is in the path of forward movement of a stop nut 98 (shown as a split nut with a cross screw 99 to tighten it) mounted on the spindle. When the nut 98 strikes bearing 95, since the spindle continues to rotate under the influence of the drive gear, the feed gear necessarily moves backward on the spindle and forces piston 86 to the right, as viewed in FIG. 3.

To control the advance and reaction of the spindle, we provide a main valve 100 which is located in a transverse bore 101 in the housing body. This valve is controlled by a pilot valve 102 mounted in a bore 103 in the housing body, the pilot valve being actuated by the feed gear moving backward to operate piston 86. Further, the retraction of the spindle is effective to operate a limit valve 104, as will be described later.

Referring first to the main valve, this comprises a spool-like member 105 movable axially in a sleeve 106 with three axially spaced sections 107, 108, and 109, respectively, and an end knob 110 exteriorly of the housing body. As shown in FIG. 8 and in the diagram FIG. 10, a passage 112 communicating with the bore at the right end of the main valve leads to the normally closed pilot valve 102. The latter includes a valve element 114 axially movable in a guide 115 and normally seated in body 116 to close the passage through the valve connecting the exterior passage 117 which leads to a source of air under pressure and passage 112 to the main valve. A spring 118 yieldably holds the valve element on its seat and the valve is adapted to be unseated or opened by a piston 119 in a cylindrical bore 120. The piston is actuated by means of hydraulic fluid introduced through passage 121 leading from space 122 associated with piston 86 that is actuated by the feed gear. A spring 123 normally holds the piston in the position shown. The piston travel prior to opening the valve is controlled by an adjustable stem 124 which is threadedly mounted in valve element 114.

When the pilot valve is opened by pressure of hydraulic fluid against piston 119 resulting from actuation of piston 86 by feed gear 27, air under pressure passes through the pilot valve to the end of the main valve and moves it to the left, as viewed in FIG. 8, thereby establishing communication between the air supply passage 126 thereto and a passage 127 leading to the brake. Consequently the brake is moved forward, disengaging coupling member 47 from spur gear 46 and engaging gear 46 to stop its rotation and that of the feed gear. The spindle then rapidly retracts, since it is continuously driven by the drive gear.

In order to limit retraction of the spindle, we provide a cylindrical extension 128 on the housing and mount a sleeve 130 therein for limited axial movement to operate the limit valve 104. The sleeve is urged forward by a compression spring 131 between it and an end cap 132. The sleeve is internally threaded to accommodate a stroke limiting nut 133 that is adapted to be engaged by the stop nut 98 on the spindle when the spindle has retracted to the desired point.

Normally with the parts in the position shown in FIGS. 3 and 6 limit valve 104 is closed. However, when the spindle retracts and the stop nut 98 engages the stroke limiting nut 133, the sleeve is moved backward pivoting a lever 135 mounted at 136 which has an inner end portion 137 received in a bore 138 in the sleeve. The outer end of the lever engages the stem of valve element 139 of the pilot valve 104, opening the same which then furnishes air under pressure through passages 140 and 141 to the left-hand end of valve element 105 to the main valve 100, thus returning it to its original position. A new cycle would then be begun but for the fact that, although the main valve now connects the space 67 behind the brake 58 to "Exhaust" through passage 127 and exhaust passage 143, spring 55 can only return the coupling member 47 and brake far enough to disengage the brake from gear 46 without causing the coupling member to engage it because of latch pin 73 and consequently the feed gear "free wheels" so that the spindle neither advances nor retracts. To start a new cycle, button 75 is depressed to release the latch and allow the brake to return.

Another feature of the invention is the provision of means to enable an operator to effect a fast advance of the drill spindle in order to position the drill near the work prior to advancing the drill at the regular drilling rate. The means to be described entails the use of a reversible motor so that the drill spindle can be driven oppositely to its normal direction of rotation while the feed gear is held against rotation. Although it is possible to advance the spindle rapidly by reversing the motor as the spindle is in the course of retracting, this has little practical use and would be hard on the parts. Also, once the spindle has completely retracted and actuated the limit switch to return the main valve to its original position, rapid advance of the spindle can be effected by manually moving the main valve to the right (FIG. 8) and reversing the motor, but this requires that the main valve be manually moved to the left to stop the rapid advance and the motor returned to its normal direction of rotation for drilling and thus may be disadvantageous as requiring too many coordinated movements of the operator. We therefore provide a fast approach or fast advance valve for the purpose of supplying air under pressure to the brake 58 and causing it to engage and hold gear 46 and hence the feed gear 27 against rotation.

Referring now to FIG. 9, we show the fast advance valve, designated 150. This has a valve element 151 provided with axially spaced seal rings 152 and 153 received in a bore 154 in the housing body 14. The valve has a knob 155 in an accessible recess 156. Normally the valve is held in the position shown by a compression coil spring 157 and air under pressure behind it from a fluid supply passage 158. A second passage 143 leads to the main valve and has heretofore been referred to as the exhaust passage for the brake, and is connected through the valve to passage 160 which is an exhaust passage to the exterior, or atmosphere.

In the operation of the fast advance feature, assuming that the drill has retracted to the limit of its travel and has actuated the limit valve and thereby returned the main valve to its normal position of FIG. 8 for advancing the drill spindle, if the operator desires to rapidly advance the drill spindle he presses button 155 of valve 150 and, while holding the valve depressed, reverses the drill motor. When the valve is moved from the position in which it is shown in FIG. 9, to the left thereof, fluid under pressure is supplied by passage 158 to passage 143 which leads to the main valve and which, with the main valve in the position of FIG. 8, is in communication with the passage 127 leading to the space 67 behind the brake. Hence the brake is operated to hold gears 46 and 27 against rotation and, since the drive gear is rotating the spindle oppositely to its normal drilling direction, the spindle is rapidly advanced.

In order to then cause the spindle to advance normally for a drilling operation, the operator merely releases valve 150 and adjusts the motor to again rotate in its normal direction for drilling.

Referring now to FIGS. 11–17, we show a finger drill provided with means for precisely limiting the advance of the drill spindle. The drill has a housing 200 comprising a housing body 201 and a housing plate 202 which is secured thereto by suitable screws (not shown). The housing body is provided with a threaded counterbore in which is mounted a motor M which would normally be of the air-driven type. At the opposite end of the housing is the drill spindle 204 which extends normal to the axis of the motor drive shaft. The spindle is received in a drive gear 205 which is splined thereto, the spindle having a pair of axial grooves 206 and the drive gear having inwardly projecting splines 207 received therein. The spindle is provided with a long externally threaded portion 208 and this is threadedly received in a feed nut or gear 210. The drive gear is journaled in a bearing 212 in the housing plate and the feed gear is journaled in a bearing 213 in the housing body. Additionally a bearing 214 is interposed between the two and a needle bearing 216 surrounds the hub 217 of the feed gear which is partially received in the drive gear.

A countersink cutter or drill 220 is detachably mounted on the end of the spindle. The housing plate is formed with a cylindrical nose section 221 upon which is mounted a microadjustment footpiece assembly designated 222, as best shown in FIG. 13.

The drive gear is driven at all times when the motor is operating through a gear train which includes bevel gear 224 in the motor shaft, bevel gear 225 meshing therewith, a gear 226 which, with gear 225, are fixed on a shaft 227, and spur gears 228, 229 and 230. Gears 228 and 230 are carried on short pins 231 and 232, respectively, threadedly mounted in the housing plate 202. The combined gear 225, 226 is journaled in bearings 233 and 234. Gear 229 is mounted on an axially movable shaft 236 but is held against axial movement by a spring 237 between a retainer 239 on the shaft and a bearing 240.

The feed gear is driven in order to advance the spindle by means of gears 244 and 245, the latter being mounted on a short pin 246 threaded into the housing body. Gear 244 is carried on the shaft 236 and is retained against axial movement relative thereto by retainer ring 247 and a bearing 248 which fits against a shoulder 249 inside the gear and lies between retainer ring 239 and shoulder 250 on the shaft. When this gear is in the position shown in FIG. 13 it is in engagement with gear 229 below it and hence it and the gears with which it is connected are driven by a motor so that the gear rotates. This is due to interengaging teeth 244' and 229' on the gears 244 and 229, respectively. However, gear 244 is adapted to be raised out of engagement with gear 229 and into engagement with a stationary brake 252, the gear having a serrated end face 253 to engage a corresponding face 252' on the brake. To advance the drill spindle, gear 244 is held in the position shown by air or gas under pressure in a cylinder 254 at the outer end of a piston 255 mounted on the upper end of the shaft 236. In order to retract the spindle, gear 244 is disengaged from gear 229 by introducing air under pressure below the piston 255 and exhausting air from the space above it.

As in the other form of the invention, it is a particular feature that means is provided for positively limiting the forward motion of the spindle. This is accomplished by providing a fixed abutment which takes the form of a bearing 258 in the housing body in the path of a stop nut 260 mounted on the spindle at any desired point. The stop nut necessarily should be one capable of being tightly secured in place and has been shown as split with a transverse takeup screw 261. Also, as in the other form of the invention, the feed gear is mounted so that it may move axially a limited amount. Normally, it is pressed forward and held in the position shown in FIG. 13 by spring means 263 which may comprise Belleville springs interposed between bearing 213 and bearing 215. When the stop nut 260 abuts the bearing 258, thereby preventing any further advance of the drill spindle, since the feed gear 210 is still being rotated, it necessarily retracts axially against the springs 263, and this movement is taken advantage of to set in motion the means for causing the drill spindle to retract.

In general, flow of air to the piston 255 is controlled by the position of a main valve 264 (see diagram, FIG. 17). The main valve selectively supplies air to the top or bottom of the piston, as shown on the diagram, from the source of air under pressure from a conduit or passage 265 through two passages 265A and 265B leading to the valve. The main valve is operated to effect automatic retraction of the spindle by the introduction of air under pressure thereto into the valve chamber at the right-hand end by a pilot valve 267 which in turn is operated by a lever 268 operated by axial movement of feed gear 210.

Referring to the parts more in detail, the main valve (FIG. 16) is mounted in a sleeve 270 in a transverse bore 271 in the main body of the housing. Passages 272 and 273 lead to the top and bottom, respectively, of the cylinder 254 in which piston 255 operates. Passages 265A and 265B lead from a source of air under pressure. Passages 274 and 275 are exhaust passages. Passage 277 leads from the pilot valve 267. The main valve includes a valve element 278 of the spool type having three radially enlarged axially spaced sections 279, 280 and 281, respectively, and a handle or knob 282. Suitable seal rings are provided as shown. With the valve in the position shown in FIG. 16 air is supplied to the space above the piston 255 through passages 265B and 272 and the space below the piston is connected to exhaust passage 274 through passage 273 and the main valve.

Pilot valve 267 includes a valve element 285 yieldably held against its seat by a spring 286. An inlet passage 287 leads from a source of air under pressure. An outlet passage 277 connects with the righthand end of the main valve, as shown in FIGS. 16 and 17. The pilot valve is operated by the lever 268 which is pivotally mounted at 290 in a recess 291 in the housing body. The lever has a short arm which is in the path of backward movement of the long hub portion 210' of the feed gear and a long arm which is adjustably mounted on a stem 285' of the valve.

In the operation of the device with the parts in the position shown in the drawings, the feed gear is driven by the motor along with the drive gear in a direction opposite to the threaded connection between the feed gear and spindle, but due to a slightly different gear ratio, the feed gear rotates sufficiently fast relative to the drive gear that the spindle is advanced. When the stop nut 260 abuts the bearing 258, the forward motion of the spindle is accurately and positively stopped, with the result that the feed gear necessarily backs up on the spindle, thereby pivoting lever 268 which opens the pilot valve. Air under pressure is then thereby supplied to the right-hand end of the main valve, moving valve element to the left. This connects the space in the cylinder beneath the piston 255 with air under pressure through passages 265A and 273 and connects the space above the piston to exhaust passage 274 through passage 272. This causes the disengagement of gears 244 and 229, the engagement of gear 244 with the brake 252, thereby stopping the feed gear which causes the spindle to retract relatively rapidly. If the retraction is not stopped by the operator, when shoulder 295 on the spindle strikes the lower end of the drive gear, retraction will stop due to the fact that the serrated faces 253 and 254 between gear 244 and the brake are such as to permit the gear to turn and back off slightly from the brake.

Although we have illustrated and described preferred forms of our invention, we contemplate that various changes and modifications can be made therein without departing from the invention, the scope of which is indicated by the following claims.

We claim:

1. A positive depth control drill, comprising a motor, a drill spindle with an external screw thread, a drive connection between said motor and said spindle for rotating the spindle and permitting axial movement thereof, an internally threaded rotatable feed member threadedly receiving said spindle and mounted for limited axial movement, yieldable means normally holding said feed member at the forward limit of its axial travel, means operatively connecting said feed member to said motor, means for positively limiting the advance of the spindle including a stop on the spindle and an abutment fixed with relation to said motor and drive member and located in the path of forward movement of said stop, and means for disconnecting said feed member from said motor in response to axial movement of said feed member backward against the force of said yieldable means.

2. The drill set forth in claim 1 in which the means for disconnecting said feed member from said motor includes a piston in a fluid control system actuated by the feed member moving backward.

3. The drill set forth in claim 1 in which the means for disconnecting said feed member from said motor includes a fluid control system having a valve therein and a valve-operating member operably mounted between said feed member and said valve and responsive to backward movement of the feed member.

4. The drill set forth in claim 3 in which said valve-operating member is a lever.

5. The drill set forth in claim 1 in which the means for disconnecting said feed member from said motor includes a fluid-operated pilot valve, a main valve operable in response to said pilot valve, and a piston in the path of backward movement of said feed member operable to force fluid to operate said pilot valve.

6. In a positive depth control drill, a housing, a motor mounted on the housing, a drill spindle received through the housing and having an external screw thread, a spindle drive train operatively connected to said motor and including a rotatable drive member receiving said spindle and splined thereto, said spindle being axially movable through said drive member, an internally threaded rotatable feed member threadedly receiving said spindle and mounted for limited axial movement in the housing, spring means urging said feed member axially to the limit of its forward movement, means operatively connecting said feed member to said motor, means for positively limiting the advance of the spindle including a stop member on the spindle and an abutment in the housing fixed against movement axially of the spindle, said housing having a cylindrical chamber beyond the back end of said feed member, a piston in said chamber adapted to be moved by axial backward movement of the feed member, and means including a fluid in said chamber responsive to movement of said piston for disconnecting said feed member from the motor.

7. The drill set forth in claim 6 in which means is provided for arresting retraction of the drill spindle including a limit valve and a valve operating assembly including a member in the path of movement of the stop member on said spindle movable a limited extent when engaged by the stop member.

8. The drill set forth in claim 7 in which said valve operating assembly comprises a spring-biased internally threaded sleeve surrounding said spindle with a limit nut therein, and a lever operated by the sleeve and operably associated with the valve.

9. In a positive depth control drill, a spindle having external screw threads and adapted to mount a drill bit, a motor, a drive gear driven by the motor receiving said spindle and splined thereto, said spindle being axially movable through said drive gear, an internally threaded feed gear threadedly receiving said spindle, means for establishing a driving connection between said feed gear and said motor, including a shiftable coupling member between the motor and feed gear, a brake member movable from a normal position to shift said coupling member and thereby disengage the driving connection between said feed gear and the motor and further movable to act as a brake for said feed gear, means for so moving said brake, and each means effective, upon return movement of said brake toward said normal position, to hold said brake in an intermediate position such that the driving connection between the motor and the feed gear remains disengaged but the brake does not restrain rotation of the feed gear.

10. The drill set forth in claim 9 in which the feed gear is mounted for limited axial movement backward against a resilient means, in which means is provided for positively limiting forward movement of the spindle, and in which means is provided responsive to backward movement of the feed gear supplying the force necessary to move said brake member.

11. The drill set forth in claim 10 in which the feed gear is mounted for limited axial movement backward against a resilient means, in which means is provided for positively limiting forward movement of the spindle, in which means is provided responsve to backward movement of the feed gear supplying the force necessary for moving said brake member, and in which means is provided responsive to retraction of the spindle a predetermined amount for relieving the force for moving said brake member.

12. In a positive depth control drill, a motor, a drill spindle with an external screw thread, a drive connection between said motor and the spindle for rotating the spindle and permitting axial movement thereof, an internally threaded rotatable feed member threadedly receiving said spindle, shiftable coupling means for establishing a drive connection between said motor and said feed member, a fluid-operated brake operable to shift said coupling means to disengage the drive connection between the feed member and the motor and operable to hold the feed member against rotation, a fluid control system for said brake including a main valve operable in one position to supply fluid to operate the brake and operable in a second position to exhaust fluid from the brake, and a normally ineffective overriding fast advance valve operable, when actuated, to prevent exhaust of fluid from the brake through the main valve when the latter is in said second position and to supply fluid under pressure to the brake through the main valve, whereby to permit of said spindle being rapidly advanced by concurrently reversing the motor.

13. The drill set forth in claim 12 in which said feed member is mounted for limited axial movement in which spring means is provided urging said feed member forward, in which stop and abutment means are provided for positively limiting the advance of the spindle, and in which means responsive to backward movement of said feed member is provided for actuating said main valve.

14. The drill set forth in claim 13 in which means is provided for arresting retraction of the drill spindle including a limit valve operable in response to return movement of the spindle and effective to shift the position of the main valve.

15. A positive depth control drill, comprising a motor, a drill spindle with an external screw thread, a drive connection between said motor and said spindle for rotating the spindle and permitting axial movement thereof, an internally threaded rotatable feed member threadedly receiving said spindle and mounted for limited axial movement, yieldable means normally holding said feed member at the forward limit of its axial travel, means operatively connecting said feed member to said motor including a double-acting piston, means for positively limiting the advance of the spindle including a stop on the spindle and an abutment fixed with relation to said motor and drive member and located in the path of forward movement of said stop, and means for controlling flow of fluid to and from said piston including a valve, and means operable in response to axial backward movement of said feed member against the force of said yieldable means, to operate said valve.

References Cited

UNITED STATES PATENTS

| 434,576 | 8/1890 | Wyman | 77—34.7 |
| 3,124,817 | 3/1964 | Mosier | 77—34.7 XR |
| 3,429,206 | 2/1969 | Quackenbush | 77—34.7 |

FRANCIS S. HUSAR, Primary Examiner

U.S. Cl. X.R.

77—32.1, 32.9, 32.5, 34.7